(12) United States Patent
Lohmann et al.

(10) Patent No.: US 8,702,159 B2
(45) Date of Patent: Apr. 22, 2014

(54) VEHICLE BODY COMPRISING A LONGITUDINAL MEMBER AND AN ELASTOMER BEARING ARRANGED THEREON, ESPECIALLY AS A TRANSMISSION MOUNTING

(75) Inventors: Bernard Lohmann, Gifhorn (DE); Maria-Rita Lohmann, legal representative, Gifhorn (DE); Werner Krauth, Wolfsburg (DE); Gwendolin Schifferli, Bahrdorf-Saalsdorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/261,459

(22) PCT Filed: Mar. 30, 2011

(86) PCT No.: PCT/EP2011/001596
§ 371 (c)(1),
(2), (4) Date: Dec. 27, 2012

(87) PCT Pub. No.: WO2011/120683
PCT Pub. Date: Oct. 6, 2011

(65) Prior Publication Data
US 2013/0088047 A1      Apr. 11, 2013

(30) Foreign Application Priority Data
Apr. 3, 2010   (DE) .................... 10 2010 013 840

(51) Int. Cl.
*B60K 17/06*   (2006.01)
(52) U.S. Cl.
USPC ............................... 296/203.03; 296/187.03
(58) Field of Classification Search
CPC ...................................................... B60K 5/1208
USPC ............ 296/35.1, 35.2, 187.03, 187.08, 209, 296/203.01, 203.03, 205, 203.02; 280/784
IPC ......................................................... B60K 7/06
See application file for complete search history.

(56) References Cited

U.S. PATENT DOCUMENTS 3,851,912 A     12/1974  Grosseau et al.
6,113,144 A *    9/2000  Lapic ........................... 280/788
(Continued)

FOREIGN PATENT DOCUMENTS

DE     2308825     9/1973
DE     2757645     6/1979
(Continued)

OTHER PUBLICATIONS

International Search Report and Written Opinion issued for PCT International Patent Application No. PCT/EP2011/001596, mailed on Jun. 20, 2011.

(Continued)

*Primary Examiner* — Glenn Dayoan
*Assistant Examiner* — Pinel Romain
(74) *Attorney, Agent, or Firm* — Pearl Cohen Zedek Latzer Baratz LLP

(57) ABSTRACT

The invention relates to a vehicle body comprising at least one longitudinal member (1) and an elastomer bearing (3) arranged thereon for supporting a vehicle component. Said elastomer bearing (3) consists of a first stable bearing part (4) attached to the body and a second stable bearing part (5) connected to the component, and an elastomer body (6) is arranged between the bearing parts. According to the invention, the elastomer bearing (3) is arranged at least partially in a receiving cavity (2) on the longitudinal member (1), and the first bearing part (4) attached to the body spans the receiving cavity (2) in the form of an impact bridge fixed to the edges of the cavity.

8 Claims, 2 Drawing Sheets

(56) References Cited

U.S. PATENT DOCUMENTS

| | | | |
|---|---|---|---|
| 6,427,795 B1 * | 8/2002 | Johnson et al. | 180/89.14 |
| 6,692,052 B1 * | 2/2004 | Sutton et al. | 296/35.2 |
| 2001/0054521 A1 | 12/2001 | Hawener et al. | |
| 2004/0245806 A1 * | 12/2004 | Mori et al. | 296/187.03 |
| 2006/0108725 A1 | 5/2006 | Ogawa et al. | |
| 2007/0138840 A1 * | 6/2007 | Caliskan et al. | 296/205 |
| 2011/0056761 A1 | 3/2011 | Weissbecker et al. | |

FOREIGN PATENT DOCUMENTS

| | | |
|---|---|---|
| DE | 3115394 | 11/1982 |
| DE | 3507042 | 8/1986 |
| DE | 19703520 | 5/1998 |
| DE | 19909726 | 9/2000 |
| DE | 10031165 | 1/2002 |
| DE | 10200604094 | 3/2008 |
| DE | 202008003072 U1 | 6/2008 |
| EP | 0195884 | 10/1986 |
| EP | 1834862 | 9/2007 |
| GB | 2096952 | 10/1982 |
| GB | 2347653 | 9/2000 |
| KR | 2006 0067354 | 6/2006 |

OTHER PUBLICATIONS

German Search Report issued for German Patent Application No. 10 2010 013 840.1, mailed on Apr. 3, 2010.
Third Party Submission in European Patent Application Publication No. EP 2 555 936, dated Jul. 29, 2013.

* cited by examiner

VEHICLE BODY COMPRISING A LONGITUDINAL MEMBER AND AN ELASTOMER BEARING ARRANGED THEREON, ESPECIALLY AS A TRANSMISSION MOUNTING

CROSS-REFERENCE TO RELATED APPLICATIONS

This application is a National Phase Application of PCT International Application No. PCT/EP2011/001596, International Filing Date Mar. 30, 2011, claiming priority of German Patent Application No. 10 2010 013840.1, filed Apr. 3, 2012, which is hereby incorporated by reference.

FIELD OF THE INVENTION

The invention relates to a vehicle body having at least one longitudinal chassis beam and an elastomer bearing arranged thereupon for purposes of mounting a vehicle component, according to the generic part of claim 1.

BACKGROUND OF THE INVENTION

A vehicle body of the generic type having at least one longitudinal chassis beam and an elastomer bearing arranged thereupon for purposes of mounting a vehicle component is generally known. Such elastomer bearings are usually rubber-metal bearings and consist of a first sturdy bearing part that is permanently attached to the vehicle body and of a second sturdy bearing part that is permanently attached to the component, whereby an elastomer element is arranged between the bearing parts. Such elastomer bearings are generally known in a wide array of configurations, also as fluid bearings, and are selected and dimensioned as a function of the given circumstances and requirements.

Towards this end, it is common practice to attach the elastomer bearing with a bearing block to the associated longitudinal chassis beam, for instance, as a transmission mount. Due to its geometrical and vibration characteristics, such a transmission mount normally occupies a relatively low position in the front part of a vehicle body. The profile size, especially the profile height of a longitudinal chassis beam, and thus the force level of the longitudinal chassis beam are limited and restricted by the low position of the transmission mount which is situated on the longitudinal chassis beam.

It is likewise a known procedure to mount a rear-axle differential of a motor vehicle (German patent application DE 35 070 42 A1) that is joined by a center pipe unit to a dual-mount internal-combustion front engine. Here, the rear-axle differential that is joined to the center pipe is supported on the structure by means of a single bearing element that is installed on the side and that is held in a recess integrated into the differential housing, so that the bearing is at the smallest possible distance from the drive shaft in a low-torsion zone. Moreover, a longitudinal chassis beam can surround the bearing element like a shell having a recess, whereby such a recess can account for a weakening of the longitudinal chassis beam.

Furthermore, a transmission mount is known that is integrated into a cross beam and that has a bearing axis running in the lengthwise direction of the vehicle (German patent specification DE 100 31 165 C2). In case of a collision, the transmission is systematically displaced towards the rear or towards the top along a crash runner, whereby the core of the transmission mount is supposed to rupture so that it does not prevent such a systematic displacement of the transmission.

Moreover, a body-in-white of a motor vehicle is known (German patent specification DE 199 09 726 B4) in which, among other things, a console is integrated on which an upright transmission mount can be placed and secured.

Furthermore, a bearing device is known for mounting a vehicle component, especially a transmission, on a vehicle body (German patent application 10 2006 041 094 A1) in which an elastic bearing element is accommodated in a holding part that is joined to a longitudinal chassis beam by means of a complicated arrangement.

A bearing arrangement is also known, especially on a rear axle (German patent specification 197 03 520 C1) in which, for purposes of securing the bearing, a screw part is screwed into a tray-like receptacle that can be a one-piece part of the body-in-white.

SUMMARY OF THE INVENTION

The objective of the invention is to refine a vehicle body of the generic type in such a way that, with the elastomer bearing in a low position, the force level of the longitudinal chassis beam can be increased.

This objective is achieved in that the elastomer bearing rests at least partially in a holding cavity in the longitudinal chassis beam, and the first bearing part that is permanently affixed to the vehicle chassis spans the holding cavity as a crash bridge.

By at least partially embedding the elastomer bearing into a cavity in the longitudinal chassis beam, relatively large longitudinal chassis beam profiles can be employed in order to increase the force level of the longitudinal chassis beam, whereby the relatively low position of the elastomer on the longitudinal chassis beam can be attained. Weakening of the longitudinal chassis beam due to the holding cavity, especially in case of a collision, is prevented in that the first bearing part that is permanently affixed to the vehicle chassis spans the holding cavity as a crash bridge that is attached to the edges of the cavity. Therefore, in case of a collision, an essentially unimpaired continuous force curve is obtained along the longitudinal chassis beam. Here, the first bearing part that is permanently affixed to the vehicle chassis thus performs a dual function, namely, as a bearing part of the elastomer bearing on the one hand, and as a crash bridge that spans and reinforces the holding cavity on the other hand.

The inventive configuration of a bearing seat can be employed to mount a wide array of vehicle components. Preferably, in one concrete embodiment, the vehicle component that is to be mounted is a transmission, whereby an elastomer bearing is installed as the transmission mount on both sides of the transmission on two opposite longitudinal chassis beams of the vehicle body structure. Particularly in the case of such transmission mounts, a low position in the front part of the vehicle has to be taken into consideration.

In an especially preferred embodiment, the holding cavity is configured in the longitudinal chassis beam so as to be tray-like and facing upward.

As the crash bridge, the first bearing part can be formed by a curved profile with opposing edge flanges like a top-hat profile, whereby the profile with its curvature is oriented approximately in the crosswise direction of the vehicle. The holding cavity here is covered, especially in the lengthwise direction, corresponding to the force curve in case of a collision, and it is attached to the longitudinal chassis beam by means of the opposing edge flanges.

The second bearing part here can extend out of the profile curvature of the first bearing part crosswise to the longitudinal chassis beam in order to create a connection to the vehicle component that is to be mounted, especially a transmission.

In this context, a space should be left free between the elastomer bearing embedded in the holding cavity and the bottom of the cavity so that, if applicable, a deflection of the bearing is made possible for the second bearing part, or else a simple installation is ensured for an elastomer bearing that is closed from below.

BRIEF DESCRIPTION OF THE DRAWINGS

The invention is explained in greater detail on the basis of the drawing.

The following is shown.

DETAILED DESCRIPTION OF THE INVENTION

Figure 1:
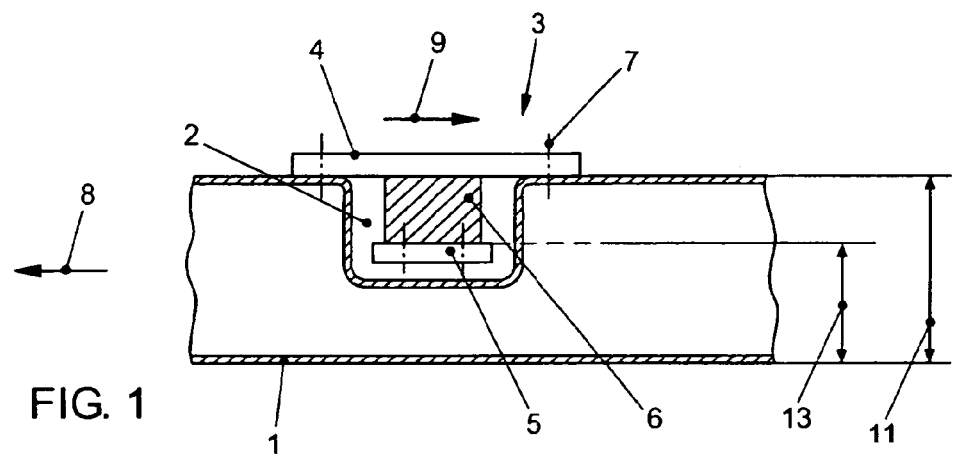
FIG. 1: a schematic lengthwise section through a longitudinal chassis beam in the area of a transmission mount arrangement according to the invention.

The highly schematic lengthwise sectional depiction in FIG. 1 shows a section of a longitudinal chassis beam 1 in the front part of a vehicle body, whereby a tray-like holding cavity 2 facing upward is formed in said longitudinal chassis beam.

For a transmission mount, an elastomer bearing in the form of a rubber-metal bearing is embedded into the holding cavity 2. The elastomer bearing consists of a first bearing part 4 that is permanently attached to the longitudinal chassis beam and of a second sturdy bearing part 5 that is joined to the transmission (not shown here). An elastomer element 6 is arranged between the two bearing parts 4 and 5. For purposes of explaining the function, the elastomer bearing 3 is shown in a greatly simplified manner with a first bearing part 4 and a second bearing part 5 in the form of metal plates and with a rubber block formed between them as the elastomer element 6.

As the crash bridge, the metal plate of the first bearing part 4 spans the holding cavity 2 and is laterally attached to the opposing edges of the cavity. Screws or rivets, for example, can be used as the fixation means 7. In the driving direction, shown by the arrow 8, in case of a head-on collision, the force curve occurs opposite to the driving direction indicated by the arrow 9. It can be seen that, in case of a collision, due to the first bearing part 4 as the crash bridge, a virtually unimpaired force curve runs along the longitudinal chassis beam 1.

Figure 2:
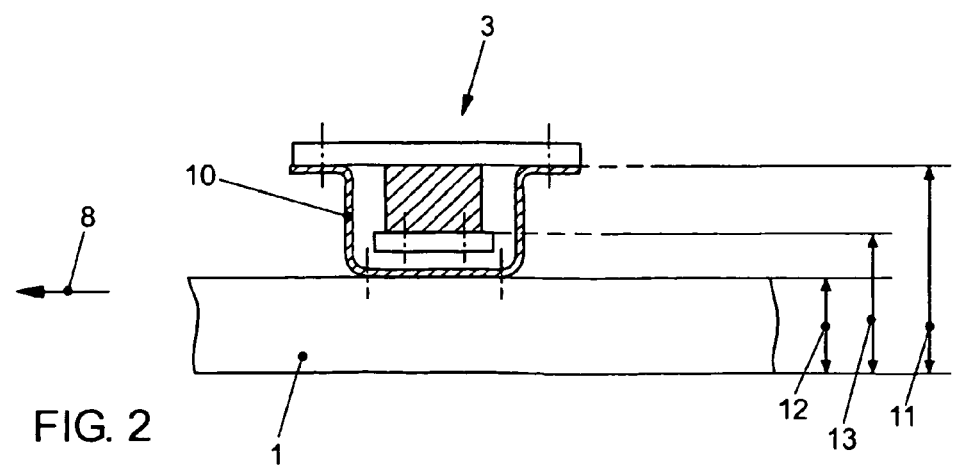
FIG. 2: a bearing seat as shown in FIG. 1, according to the state of the art.

In the embodiment according to FIG. 2, which corresponds to the state of the art, in contrast, a bearing block 10 containing the elastomer bearing 3 has been placed upon the longitudinal chassis beam. The installation height 11 available here, for instance, is utilized by the relatively small installation height 12 of the profile of the longitudinal chassis beam and by the elastomer bearing 3 that has been placed upon the beam. According to the invention, as shown in FIG. 1, the same available installation height 11 is utilized to increase the force level of the longitudinal chassis beam in its entirety by the profile size of the longitudinal chassis beam 1. It can be seen here that the level of the transmission connection is at the same height 13 in FIG. 1 as in FIG. 2.

Figure 3:
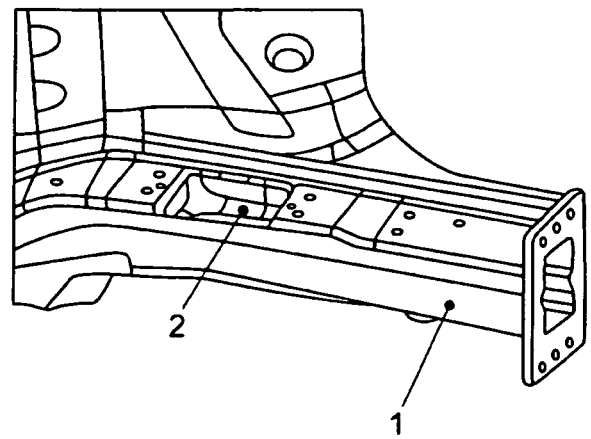
FIG. 3: a perspective view of a concrete longitudinal chassis beam, with a holding cavity.

The perspective view according to FIG. 3 depicts a concrete embodiment of a longitudinal chassis beam 1, with a holding cavity 2 facing upward.

Figure 4:
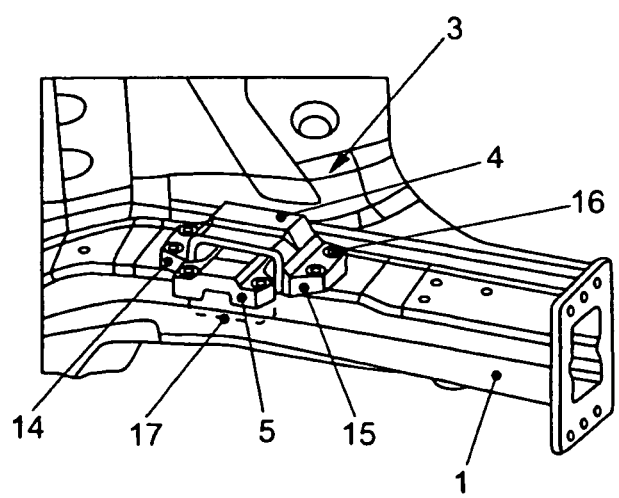
FIG. 4: a view according to FIG. 3, with a mounted elastomer bearing.

In FIG. 4, an elastomer bearing 3 has already been installed as the transmission mount in the holding cavity 2. In the concrete embodiment of the elastomer bearing 3, the first bearing part 4, as the crash bridge, is formed by a curved profile having opposing sturdy edge flanges 14, 15 that are joined in the lengthwise direction to the longitudinal chassis beam 1 on both sides of the holding cavity 2 by means of screws 16 or optionally rivets.

The second bearing part 5 here extends out of the first bearing part 4 crosswise to the longitudinal chassis beam 1 in order to create a connection to a transmission. As is depicted by the broken line 17, other elastomer bearing elements can optionally can project downwards into the holding cavity 2.

The invention claimed is:

1. A vehicle body having
at least one longitudinal chassis beam, and
an elastomer bearing arranged thereupon for purposes of mounting a vehicle component,
wherein the elastomer bearing consists of a first sturdy bearing part that is permanently attached to the vehicle body and of a second sturdy bearing part that is permanently attached to the component, and an elastomer element is arranged between the bearing parts,
wherein the elastomer bearing rests at least partially in a tray-like holding cavity created in the longitudinal chassis beam, and configured to be facing upward, and wherein the first bearing part that is permanently affixed to the vehicle chassis spans the holding cavity as a crash bridge that is attached to the edges of the cavity.

2. The vehicle body according to claim 1, wherein the vehicle component that is to be mounted is a transmission, and the elastomer bearing is installed as the transmission mount on both sides of the transmission on two opposite longitudinal chassis beams in the front part of the vehicle.

3. The vehicle body according to claim 1, wherein, as the crash bridge, the first bearing part is formed by a curved profile with opposing edge flanges, whereby the profile with its curvature is oriented approximately in the crosswise direction of the vehicle, the holding cavity here is covered, at least in the lengthwise direction, and it is attached to the longitudinal chassis beam by means of the opposing edge flanges.

4. The vehicle body according to claim 3, wherein the second bearing part extends out of the profile curvature of the first bearing part crosswise to the longitudinal chassis beam in order to create a connection to the vehicle component that is to be mounted, especially a transmission.

5. The vehicle body according to claim 1, wherein a space is left free between the elastomer bearing embedded in the holding cavity and the bottom of the cavity.

6. The vehicle body according to claim 1, wherein the tray-like holding cavity is substantially U-shaped.

7. The vehicle body according to claim 1, wherein the tray-like holding cavity is closed on all four sides of said cavity.

8. The vehicle body according to claim 1, wherein the tray-like holding cavity is configured as a trough.

* * * * *